3,080,239
CERAMIC DIELECTRIC COMPOSITIONS AND
METHOD OF MAKING THE SAME
Herbert Zlotnick, New York, N.Y., assignor to Mucon
Corporation, a corporation of New Jersey
No Drawing. Filed Apr. 21, 1961, Ser. No. 115,063
8 Claims. (Cl. 106—39)

This invention relates to ceramic dielectric compositions and to method for making the same. More particularly, the present invention is directed to ceramic dielectric compositions having barium titanate as a major ingredient, such as find extensive use in the manufacture of capacitors or ferroelectric elements.

Ceramic dielectric materials of the general character contemplated by the present invention possess the desirable properties of high dielectric constant, operability over wide temperature ranges, high breakdown voltage, high humidity resistance, and low dielectric losses. In recent years, the electronics industry has imposed ever increasingly stringent requirements in regard to these properties upon the ceramic dielectric manufacturing industry, prompted by the ever increasingly stringent requirements of reliable operation of electronic equipment under adverse environmental conditions.

For example, until recently reliable operation of capacitors over a temperature range of from $-55°$ C. to $+125°$ C. had been considered satisfactory. The upper temperature limit should be higher to meet present-day demands, and it is an object of the present invention to extend such upper limit to at least $+150°$ C., without disturbing, and in fact improving other desirable properties of the ceramic dielectric materials.

Ceramic dielectric materials of the general character contemplated by the present invention may be generally classified in two groups, namely general purpose dielectric materials and dielectric materials having substantially constant coefficient (including zero) of capacitance change with temperature. The former have nominal dielectric constants of from 600 upward, and will usually undergo enormous changes in capacitance at certain limited temperature ranges defining the Curie point of the material, as explained in Patent 2,721,182. For this reason they are normally not used in electric circuits where the capacitance value must obey an accurate, predetermined characteristic with respect to temperature, usually approximately straight-line, as for example in tuned circuits; instead the latter type of dielectric material is employed for such purpose. This latter type of dielectric material exhibiting constant coefficient of capacitance change with temperature may typically have a dielectric constant of up to 100; it is therefore not as suitable for use as dielectric of capacitors requiring a large capacitance in a small volume, as for example in the case of coupling or bypass capacitors. The general purpose dielectrics, with their higher dielectric constants are more suitable for such applications, even though their exact capacitance values are not nearly as readily predictable or controllable owing to the radical changes in capacitance in the region of the Curie point.

An object of the invention is provision of a high dielectric constant ceramic dielectric material, which is suitable for general purpose applications and yet possesses a repeatably predictable temperature characteristic similar to the constant coefficient of capacitance change dielectric materials.

I have discovered that ceramic dielectric compositions may be prepared with barium titanate as major constituent (88–95% by weight), which have remarkable stability over a wide range of temperature by reason of the inclusion of minor amounts of the metallic oxides of bismuth, tin and niobium (columbium). More particularly, the family of compositions given by the following ranges has been found to experience a change in dielectric constant from a nominal value in excess of 2000, of no greater than $\pm 10\%$ over the range of from $-55°$ C. to $+150°$ C., and are still operational at $+175°$ C.:

| | Percentage by weight |
|---|---|
| Barium titanate ($BaTiO_3$) | 88–95 |
| Bismuth oxide ($Bi_2O_3$) | 0.75–2.0 |
| Bismuth stannate ($Bi_2(SnO_3)_3$) | 0.75–2.5 |
| Stannic oxide ($SnO_2$) | 1.5–3 |
| Niobium pentoxide ($Nb_2O_5$) | 0.25–1.5 |

In a most preferred embodiment of the invention, the composition by weight is more specifically:

| | Percentage by weight |
|---|---|
| Barium titanate ($BaTiO_3$) | 94.6 |
| Bismuth oxide ($Bi_2O_3$) | 1.2 |
| Bismuth stannate ($Bi_2(SnO_3)_3$) | 1.2 |
| Stannic oxide ($SnO_2$) | 2.5 |
| Niobium pentoxide ($Nb_2O_5$) | 0.5 |

The above dielectric compositions may be prepared in the following manner. A mixture of the ingredients is prepared in the above specified proportions together with any of the common temporary binders, such as polyvinyl butyrate dissolved in ethyl acetate or polystyrene dissolved in toluene.

The mixture of the ingredients, temporary binder and solvents is placed in a ball mill, for example one that includes a porcelain jar and porcelain balls, and is subjected to milling action for a period of from 24 to 48 hours. A homogeneous blend is formed which has such a state of consistency that it can be readily poured to the form of thin films.

One common technique for attaining the desired film thickness is with the use of a doctor blade. This may be used in connection with the herein described compositions. When the desired viscosity is attained, the film is cast on a non-porous medium, the solvents are allowed to evaporate, and the binder to set. When adequately set, the film can be readily removed from the non-porous medium, cut to the desired size and placed on a stabilized zirconia batt. The stabilized zirconia batt is usually sprinkled with 325 mesh zirconia sand to prevent any reaction between the batt and the ceramic film.

The sanded batt with the film placed on top of it is then placed in a kiln, and the temperature increased slowly to about 900° F. to burn off the temporary binder. The rate of rise of temperature initially is very slow, to minimize any disturbance in the film, in order that the geometry is not disturbed or distorted. After the temporary binder is burned off, the rate of rise of temperature is increased till the maturing temperature of about 2550° F. is reached. At this point in the firing cycle the kiln is allowed to soak at the maturing temperature from one-half to four hours. The power is cut off at the end of the soaking period and the kiln allowed to cool.

The ceramic sheets are then silvered and ceramic dielectric capacitors are produced by well-known techniques.

The inclusion of niobium pentoxide in the described compositions is for a dual purpose. It improves the characteristics of the compositions in the higher temperature range and serves as an oxygen donor to the compositions. The niobium pentoxide prevents reduction of the ceramic dielectric when fired to maturity, which might otherwise occur and result in a semi-conductor subject to electrical losses. The incorporation of bismuth and tin in its various forms alters the characteristic curve of barium titanate, so that a flat-temperature stable dielectric is produced rather than one exhibiting a sharp peak in the region of the Curie point. The desirable temperature characteristic may be at least approached even with omission of niobium pentoxide, but if this is done such characteristic is not repeatably predictable owing to the consequent high sensitivity of the firing cycle. It is believed that the addition of niobium pentoxide results in maturing of the ceramic dielectric composition uniformly throughout the body of the end product as distinguished from merely its outer surfaces. This advantageous feature permits formation of relatively thick ceramic sheets, and therefore of capacitors having relatively high breakdown and operating voltages, in addition to the aforementioned advantageous features.

From the preceding description it is seen, that in accordance with the invention there have been provided ceramic dielectric compositions with a dielectric constant in excess of 2000, which dielectric constant is substantially invariant over a temperature range of from −55° C. to +150° C., and are still operational at +175° C. Such characteristics are highly desirable in connection with the use of the compositions as dielectric material of capacitors having a large capacitance in a small volume, for example bypass and coupling capacitors. The values of power factor, breakdown voltage and humidity resistance are comparable to those of general purpose dielectrics presently known. For example, the compositions of the invention have a power factor of the order of 2.5% at one kilocycle per second measured at room temperature.

There will now be obvious to those skilled in the art modifications of the described inventive concept, which do not essentially depart from the spirit and scope of the invention, and it is intended that such modifications be embraced within such spirit and scope as defined by the aforegoing description and following claims.

What is claimed is:
1. A ceramic dielectric composition characterized by substantially uniform dielectric constant and operability over a temperature range of from −55° C. to at least +150° C., said composition having as essential constituents the following, percentages given by weight: barium titanate 88–95%; bismuth oxide 0.75–2.0%; bismuth stannate 0.75–2.5%; stannic oxide 1.5–3%; niobium pentoxide 0.25–1.5%.

2. A ceramic dielectric composition characterized by substantially uniform dielectric constant and operability over a temperature range of from −55° C. to at least +150° C., said composition having as essential constituents the following, percentages given by weight: barium titanate 94.6%; bismuth oxide 1.2%; bismuth stannate 1.2%; stannic oxide 2.5%; niobium pentoxide 0.5%.

3. A capacitor characterized by substantially uniform value of capacitance and operability over a temperature range of from −55° C. to at least +150° C. and having as dielectric a ceramic composition whose essential constituents are the following, percentages given by weight: barium titanate 88–95%; bismuth oxide 0.75–2.0%; bismuth stannate 0.75–2.5%; stannic oxide 1.5–3%; niobium pentoxide 0.25–1.5%.

4. A capacitor characterized by substantially uniform value of capacitance and operability over a temperature range of from −55° C. to at least +150° C. and having as dielectric a ceramic composition whose essential constituents are the following, percentages given by weight: barium titanate 94.6%; bismuth oxide 1.2%; bismuth stannate 1.2%; stannic oxide 2.5%; niobium pentoxide 0.5%.

5. A method of making a ceramic dielectric composition comprising mixing to a homogeneous blend materials having essentially the following percentages by weight: barium titanate 88–95%; bismuth oxide 0.75–2.0%; bismuth stannate 0.75–2.5%; stannic oxide 1.5–3%; niobium pentoxide 0.25–1.5%, together with a binder, heating said mixture to a temperature sufficient to burn off said binder, further heating the mixture to maturity temperature, and soaking it at such maturity temperature, and thereafter cooling the resultant reaction product.

6. A method of making a ceramic dielectric composition comprising mixing to a homogeneous blend materials having essentially the following percentages by weight: barium titanate 94.6%; bismuth oxide 1.2%; bismuth stannate 1.2%; stannic oxide 2.5%; niobium pentoxide 0.5%, together with a binder, heating said mixture to a temperature sufficient to burn off said binder, further heating the mixture to maturity temperature, and soaking it at such maturity temperature, and thereafter cooling the resultant reaction product.

7. A method of making a ceramic dielectric composition comprising mixing to a homogeneous blend materials having essentially the following percentages by weight: barium titanate 88–95%; bismuth oxide 0.75–2.0%; bismuth stannate 0.75–2.5%; stannic oxide 1.5–3%; niobium pentoxide 0.25–1.5%, together with a binder, heating said mixture to a temperature of about 900° F., further heating the mixture to maturity temperature of about 2550° F., and soaking it at such maturity temperature, and thereafter cooling the resultant reaction product.

8. A method of making a ceramic dielectric composition comprising mixing to a homogeneous blend materials having essentially the following percentages by weight: barium titanate 94.6%; bismuth oxide 1.2%; bismuth stannate 1.2%; stannic oxide 2.5%; niobium pentoxide 0.5%, together with a binder, heating said mixture to a temperature of about 900° F., further heating the mixture to maturity temperature of about 2550° F., and soaking it at such maturity temperature, and thereafter cooling the resultant reaction product.

References Cited in the file of this patent
UNITED STATES PATENTS

| | | |
|---|---|---|
| 2,658,833 | Coffeen et al. | Nov. 10, 1953 |
| 2,908,579 | Nelson et al. | Oct. 13, 1959 |
| 2,992,929 | Clement et al. | July 18, 1961 |

FOREIGN PATENTS

| | | |
|---|---|---|
| 755,860 | Great Britain | Aug. 29, 1956 |